United States Patent [19]
Katagiri et al.

[11] 3,919,105
[45] Nov. 11, 1975

[54] NEMATIC LIQUID CRYSTAL COMPOSITIONS EXHIBITING POSITIVE DIELECTRIC ANISOTROPY

[75] Inventors: Yoshio Katagiri, Tokyo; Yoshio Miyata, Ageo, both of Japan

[73] Assignees: Kabushiki Kaisha Daini Seikosha; Kabushiki Kaisha Seikosha, both of Japan

[22] Filed: June 5, 1973

[21] Appl. No.: 367,249

[30] Foreign Application Priority Data
June 7, 1972 Japan.............................. 47-55996

[52] U.S. Cl....... 252/299; 252/408 LC; 350/160 LC
[51] Int. Cl.²..................................... C09K 3/34
[58] Field of Search....... 252/299, 408; 350/160 LC

[56] References Cited
UNITED STATES PATENTS

| | | | |
|---|---|---|---|
| 3,770,653 | 11/1973 | Katagiri et al................ | 252/408 LC |
| 3,770,654 | 11/1973 | Katagiri et al................ | 252/408 LC |
| 3,781,085 | 12/1973 | Leibowitz..................... | 350/160 LC |
| 3,781,088 | 12/1973 | Tsukamoto et al........... | 350/160 LC |
| 3,795,436 | 3/1974 | Boller et al.................. | 252/408 LC |
| 3,796,479 | 3/1974 | Helfrich et al............... | 350/160 LC |

OTHER PUBLICATIONS

Dielectric Properties of Some Nematic Liquid Crystals with Strong Positive Dielectric Anisotropy, M. Schadt, J. Chem. Phys., Vol. 56, No. 4, pp. 1494–1497, Feb. 1972.

Chemical Characteristics, Structure, and Properties of Liquid Crystal, Usol'tseva et al, Russian Chem. Reviews, Vol. 32, No. 9, pp. 495–509. Sept. 1973.

*Primary Examiner*—Benjamin R. Padgett
*Assistant Examiner*—T. S. Gron
*Attorney, Agent, or Firm*—Robert E. Burns; Emmanuel J. Lobato; Bruce L. Adams

[57] ABSTRACT

A field-effect liquid crystal composition is provided comprising a nematic liquid crystal component including liquid crystals having negative dielectric anisotropy and orienting compounds having terminal nitro or cyano group which reverses the dielectric anisotropy and provide positive dielectric anisotropy useful for field effect displays. Field effect displays devices are also described.

8 Claims, No Drawings

NEMATIC LIQUID CRYSTAL COMPOSITIONS EXHIBITING POSITIVE DIELECTRIC ANISOTROPY

FIELD OF THE INVENTION

The present invention relates to nematic liquid crystal compositions, and more particularly to nematic liquid crystal compositions exhibiting positive dielectric anisotropy for field-effect display devices.

BACKGROUND OF THE INVENTION

Liquid crystals have recently been introduced in the field of information displays. They are particularly useful for numeric display devices. They are also useful for conveying other types of information.

Liquid crystals are fluids that are partially ordered and have some of the optical properties of crystals. Although they have been known for nearly a century, they have recently found commercial utilization in information display devices.

Liquid crystals have been classified into three types, smectic, cholesteric and nematic; of which the nematic crystals have found the greatest use with respect to display devices.

At present there are two types of nematic crystals used in displays: dynamic-scattering liquid crystals and field-effect liquid crystals. Dynamic-scattering liquid crystals are clear in the absence of an electric field. When an electric field is applied, they turn cloudy and scatter light. Devices based upon this phenomona consist of glass plate electrodes with the liquid crystal compositions sandwiched between these plates. The glass plates are coated in the selected areas with electrically conductive films to form electrodes. Suitable electroconductive film materials are tin and indium oxides. By selectively activating portions of the conductive films, localized patterns of scattered light are achieved in the nematic crystal composition confined between the glass electrode plates.

The devices based upon dynamic scattering, can be made transmissive for rear lighting applications, reflective for ambient lighting applications or semi-reflective for both types of operation. By proper choice of conductive pathways to specially shaped electrode areas, it is possible to achieve, by switching, the formation of specific information characters. The usual liquid crystal character, a numeral is ranged as a seven-stroke digit. The strokes of the digit are created by separate transparent electrode areas on the inner surfaces of two sheets of glass. If the device is to be reflective, the rear surface is made to serve as a mirror. Advantages of such liquid crystal display devices are that very little current is required to produce the dynamic liquid crystal scattering effect. Alternating current sources are preferred for activating the display characters as direct current operation tends to shorten the life of the device. Liquid crystal display devices are suited to low power applications. While transmissive displays call for auxillary lighting, recent reflective back displays have been developed which take advantage of the highly reflective characteristics of the crystals in reflecting dynamically scattered ambient light.

Field effect liquid crystal compositions, those possessing positive dielectric anisotropy, are a recent development. Such liquid crystal compositions operate by rotating the plane of polarization of incident polarized light upon the application of electrical or magnetic fields. They are particularly useful in that they have clear sharp threshhold voltages, thus permitting ease of display of the information characters. They can be operated in either the transmissive or reflective modes. They can be operated on direct current. Their power requirements are lower than those of dynamic-scattering liquid crystals. Additionally, it has been discovered that the temperature range over which these compositions function can be extended to include common ambient temperatures. The compositions of the present invention function from about 0°C to more than 80°C.

It has been known that the nematic crystal compounds having negative dielectric anisotropy such an anisilidine-p-aminophenyl acetate can be used in dynamic-scattering devices as described above. In these devices, the light is scattered upon the application of an electric or magnetic field. However, for the reasons mentioned above, there has been a recent trend to display devices using non-dynamic scattering effects, to liquid crystal composition which exhibit positive dielectric anistropy and are used in combination with polarizing filters. In these positive dielectric anisotropy devices, also known as field-effect display devices, the nematic liquid crystal compositions, exhibiting positive dielectric anisotropy are sandwiched between transparent glass electrodes coated with a conductive film such as tin or indium oxide. In the devices, the plane of polarized light is rotated while passing through the liquid crystal composition in response to the application of an electric or magnetic fields. Generally the molecules of nematic liquid are previously oriented along the surface of the electrode in order to initially be illuminated by the polarized light at certain incident angle. Thereafter, upon the application of an electric or magnetic field in the electrode areas, the plane of polarization is rotated, (usually by about 90° to give either a positive or negative image in the electrode area. The initial orientation of the nematic liquid crystals is obtained by rubbing the surfaces of the glass electrodes in contact with the nematic liquid compound in a predetermined direction in order to impart a charge to the electrodes. My U.S. application Ser. No. 338,625 describes such a display device and is suitable for use with the compositions according to this invention.

It is essential that the liquid crystals adapted for use in the liquid crystal display devices of both the dynamic-scattering and field-effect phenomena should be stable over a broad range of operative temperatures and additionally they should resist oxidation and hydrolysis. They should also be relatively colorless when inactivated.

Certain nematic liquid crystals having a Schiff-base structures exhibit positive dielectric anisotropy. However such Schiff-base compounds have a yellowish hue and are subject to rapid deterioration by oxidation and/or hydrolysis over relatively short periods of time.

STATEMENT OF THE INVENTION

It is an object of the present invention to provide nematic liquid crystal compositions suitable for use in field effect display devices. It is a further object of this invention to provide compositions exhibiting positive dielectric anisotropy which are colorless, stable under ambient operating temperatures and over a wide range operating conditions.

It is another object of the present invention to provide devices utilizing such compositions and displaying information by resort to the field-effect phenomena resulting from the positive dielectric anistropy of the novel compositions of this invention.

The nematic liquid crystal compositions exhibiting positive dielectric anisotropy of this invention comprise a nematic liquid crystal component and an orienting component. The nematic liquid crystal component consists of nematic liquid crystal compounds having negative dielectric anisotropy. These compounds are modified in the composition of this invention by the addition of an orienting component which changes the anisotropy of the crystals from negative to positive. The negative nematic liquid crystal component is a mixture of at least one liquid crystal compound from each of the two groups set forth below. The first group of nematic liquid crystal compound having negative dielectric anisotropy consists of liquid crystal compounds having the general formula

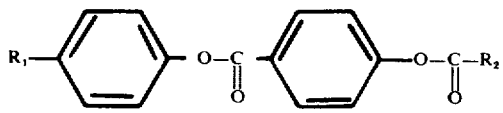

where R is an alkyl group having 2–4 carbon atoms and $R_2$ is an alkyl or alkoxy group having 3–10 carbon atoms.

The second group of nematic liquid crystal compounds having negative dielectric anisotropy has the general formula

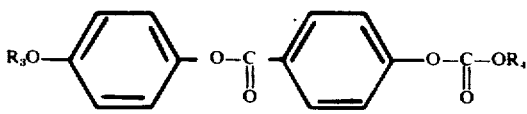

where $R_3$ is an alkyl group having 1–10 carbon atoms and $R_4$ is alkyl group having 3–10 carbon atoms. Where the length of the alkyl chain permits branching, unbranched or n-alkyl groups are preferred.

The mixture of these compounds each selected from each group and forming the nematic liquid crystal component is then mixed with an orienting component selected from the group of compounds having the formula

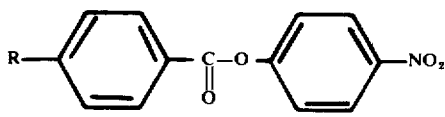

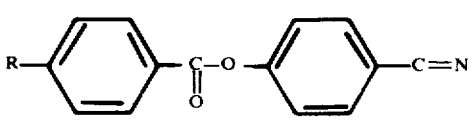

where R is an alkyl group having at least 3 carbon atoms and is preferably a straight chain alkyl group. R is preferably n-butyl (n—$C_4H_9$—). The mixing of the compound having dynamic scattering qualities and negative dielectric anisotropy with the aforesaid orienting components produces a new liquid crystal-type with field effect characteristics which has the quality of having its optical axis rotated upon the application and electric or magnetic field. The liquid crystal compositions of this invention, because of the strongly orienting positive dielectric anisotropy resulting from the location at the extreme ends of the compounds of the nitro or cyano groups, are changed in anisotropy from negative to positive and exhibit field effect qualities.

In general, the nematic liquid crystal component should consist of 20 to 80% of compounds having the formula I (above) and 80–20% of compounds having the formula II (above).

In the preferred compositions of this invention, the orienting component should be present in an amount of from 5 to 40 wt % of said entire composition, the balance being the nematic crystal component.

While these are the essential components of the composition of this invention, various diluents, solvents, pigments and surface active agents, may be added as required and practiced in this art.

EXAMPLE 1

Synthesis of

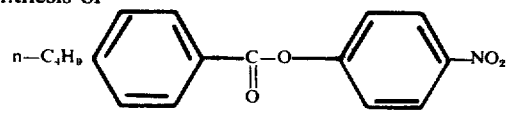

One mole of P-n-butyl benzyl chloride is mixed with one mole of P-nitrophenol at room temperature in the presence of pyridine as a proton acceptor catalyst. The desired product crystallizes from an excess of water and is purified by recrystallization from ethanol.

EXAMPLE 2

Synthesis of

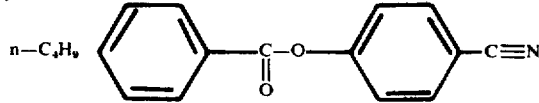

This compound is prepared by utilizing the procedure of Example 1 but substituting for the P-nitrophenol, P-cyanophenol. The final product is also recovered by recrystallization from ethanol.

EXAMPLE 3

A colorless nematic liquid crystal composition yielding stable images at temperatures from about 3° to 58°C over a long period of time and exhibiting positive dielectric anisotropy was prepared by mixing 45% by weight of

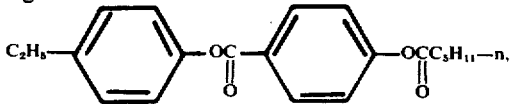

45% by weight of

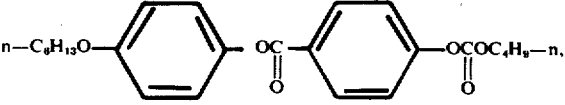

and 10% by weight of

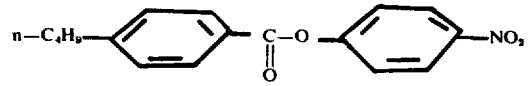

EXAMPLE 4

A colorless nematic liquid crystal composition stable at temperatures from about 80° to 60°C for a long time and exhibiting positive dielectric anisotropy was prepared by mixing
46% by weight of

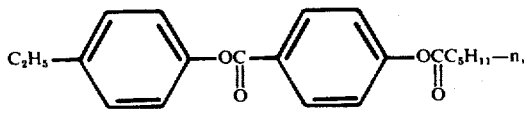

46% by weight of

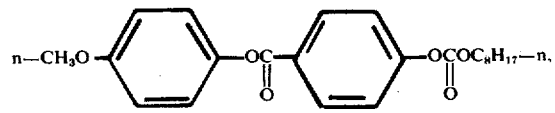

and 8% by weight of

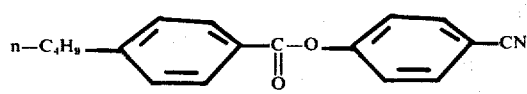

EXAMPLE 5

A colorless nematic liquid crystal composition stable at temperatures from about 6° to 56° C for a long time and exhibiting positive dielectric anisotropy was prepared by mixing 48% by weight of

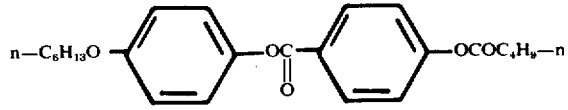

40% by weight of

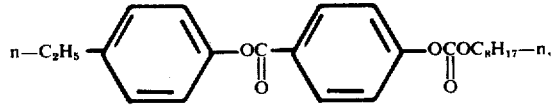

and 12% by weight of

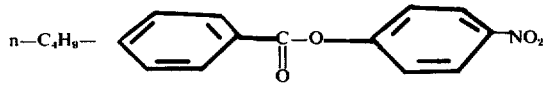

The products of Examples 3–5 according to the present invention are all stable at room temperature and exhibit dielectric anisotropy when used as liquid crystal compositions in Field-Effect Liquid Crystal Displays according to this invention. In such displays, polarizing filters are positioned on either side of a basic liquid crystal display cell. The basic cell typically consists of a liquid crystal composition, according to this invention, interposed between two glass plates upon which segmented electrode areas have been deposited. When light polarized by the first filter passes through the liquid crystal composition, having a positive anisotropy, the plane of polarization of the light is rotated at 90°. When an electric field is applied, via the electrode on the glass plate, the liquid crystal no longer rotates the light and consequently forms desired image in the electrode-activated areas of the composition for viewing through the second filter.

It is understood that the Examples appended show exemplary compounds, compositions and embodiments, some of which are currently preferred. However, these Examples are not to be interpreted as limiting the invention to such exemplary materials as all art recognized equivalents are intended.

What is claimed is:

1. Nematic liquid crystal compositions exhibiting positive dielectric anisotropy comprising a nematic liquid crystal component and an orienting component, said nematic liquid crystal component essentially consisting of a mixture of liquid crystal compounds having negative dielectric anisotropy having the formula

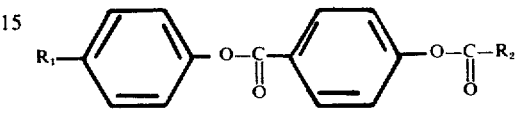

I where $R_1$ represents alkyl group of 2–4 carbon atoms and $R_2$ represents an alkyl or alkoxy group of 3–10 carbon atoms; with a liquid crystal compound having negative dielectric anisotropy having the formula

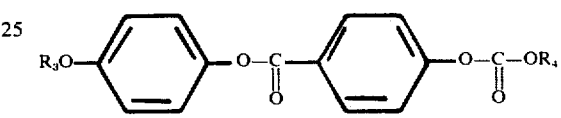

II where $R_3$ is an alkyl group of 1–10 carbon atoms and $R_4$ is an alkyl group of 3–10 carbon atoms;
and said orienting component is selected from the group consisting of strongly positive orienting compounds having the formulae

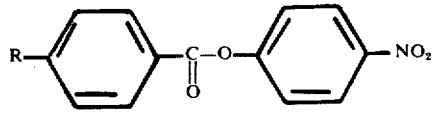

III

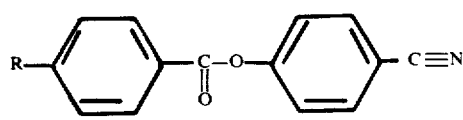

IV where R is an n-alkyl group of at least 3 carbon atoms.

2. The liquid crystal composition according to claim 1 wherein said liquid crystal compound having negative dielectric anisotropy having the formula according to I is present in an amount of 20–80 wt % of said liquid crystal component and said liquid crystal compound having the formula II is present in an amount of 80–20 wt % of said liquid crystal component.

3. The liquid crystal composition according to claim 1 wherein said orienting component is present in an amount of 5–40 wt % of said liquid crystal composition having positive dielectric anisotropy.

4. The liquid crystal composition according to claim 1 wherein R is n - butyl ($C_4H_9$).

5. The liquid crystal composition according to claim 1 wherein said liquid crystal component comprises 90% by weight of said composition and said orienting component comprises 10% by weight of said composition and said liquid crystal component consists of equal parts by weight of said compounds having the formulae

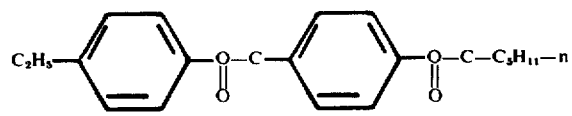

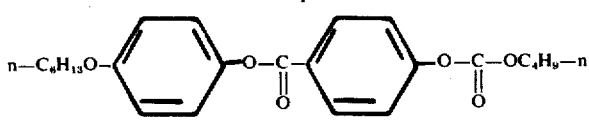

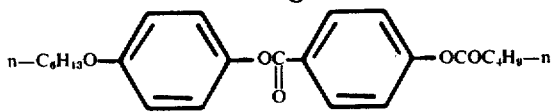

6. The composition according to claim 1 consisting of 92% by weight of said nematic crystal component and 8% by weight of said orienting component, said nematic liquid crystal component consisting of equal parts by weight of

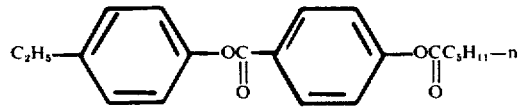

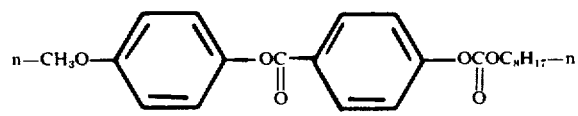

and said orienting component is

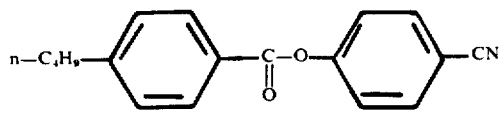

7. The nematic liquid crystal composition according to claim 1 wherein said liquid crystal component consists of 48% by weight of said composition of the compound having the formula 40% by weight of said composition of the compound having the formula

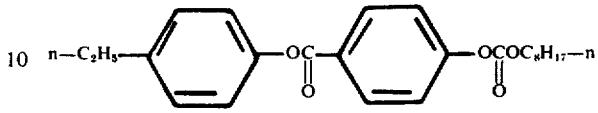

and 12% by weight of said composition of an orienting component having the formula

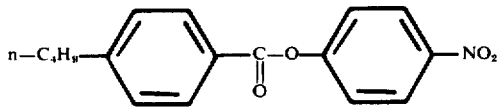

8. A nematic liquid crystal display device based upon the positive electric anisotropy of the composition according to claim 1 which comprises at least two transparent glass electrodes coated in selected surface portions thereof with electrically conductive films connected to current sources and having interposed between said coated electrode surfaces, an operative quantity of the composition according to claim 1, said device having juxtaposed polarizing filters positioned external to said interposed composition.

* * * * *